United States Patent [19]

United States Patent [19]

Rohrlach et al.

[11] Patent Number: 5,037,591
[45] Date of Patent: Aug. 6, 1991

[54] VEHICLE INNER PANEL

[75] Inventors: Milo L. Rohrlach, North Brighton; William J. Hall, Eden Hills, both of Australia

[73] Assignee: Bridgestone Australia Ltd., Edwardstown, Australia

[21] Appl. No.: 439,331

[22] Filed: Nov. 20, 1989

[30] Foreign Application Priority Data

Nov. 24, 1988 [AU] Australia ............... PJ1605

[51] Int. Cl.$^5$ .................. B29C 65/00; B29C 39/00
[52] U.S. Cl. ................... 264/46.5; 264/46.8
[58] Field of Search .......... 264/46.4, 46.6, 45.5, 264/45.6, 46.5, 46.8; 156/211

[56]  References Cited

U.S. PATENT DOCUMENTS

| 2,217,137 | 10/1940 | Roth et al. ............ 264/46.4 |
| 3,879,240 | 4/1975 | Wall . |
| 4,268,557 | 5/1981 | Bracesco . |
| 4,381,908 | 5/1983 | Roth . |
| 4,420,447 | 12/1983 | Nakashima ............ 264/46.4 |
| 4,455,340 | 6/1984 | Okina . |
| 4,474,635 | 10/1984 | Adams . |
| 4,525,231 | 6/1985 | Wnuk . |
| 4,544,126 | 10/1985 | Melchert . |
| 4,766,025 | 8/1988 | Sanok et al. . |
| 4,810,452 | 3/1989 | Taillerfert et al. . |
| 4,863,654 | 9/1989 | Belleville et al. ............ 264/46.8 X |

FOREIGN PATENT DOCUMENTS

| 265313 | 4/1988 | European Pat. Off. . |
| 4058769 | 5/1979 | Japan . |
| 7059731 | 4/1982 | Japan . |
| 089824 | 6/1962 | United Kingdom . |

Primary Examiner—David A. Simmons
Assistant Examiner—Jeffrey G. Payne
Attorney, Agent, or Firm—Darby & Darby

[57] ABSTRACT

A vehicle inner panel with a padded fabric surface, and includes firstly moulding a substrate of polymeric material, suitably polyurethane, attaching the substrate to one die of a two part die set, stretching a fabric sheet on a stretch frame, interposing the stretched fabric sheet between the other die of the die set and the substrate, injecting foam forming polyurethane through the substrate and allowing it to foam while the dies are closed, opening the dies, removing the assembly, and trimming the fabric.

8 Claims, 2 Drawing Sheets

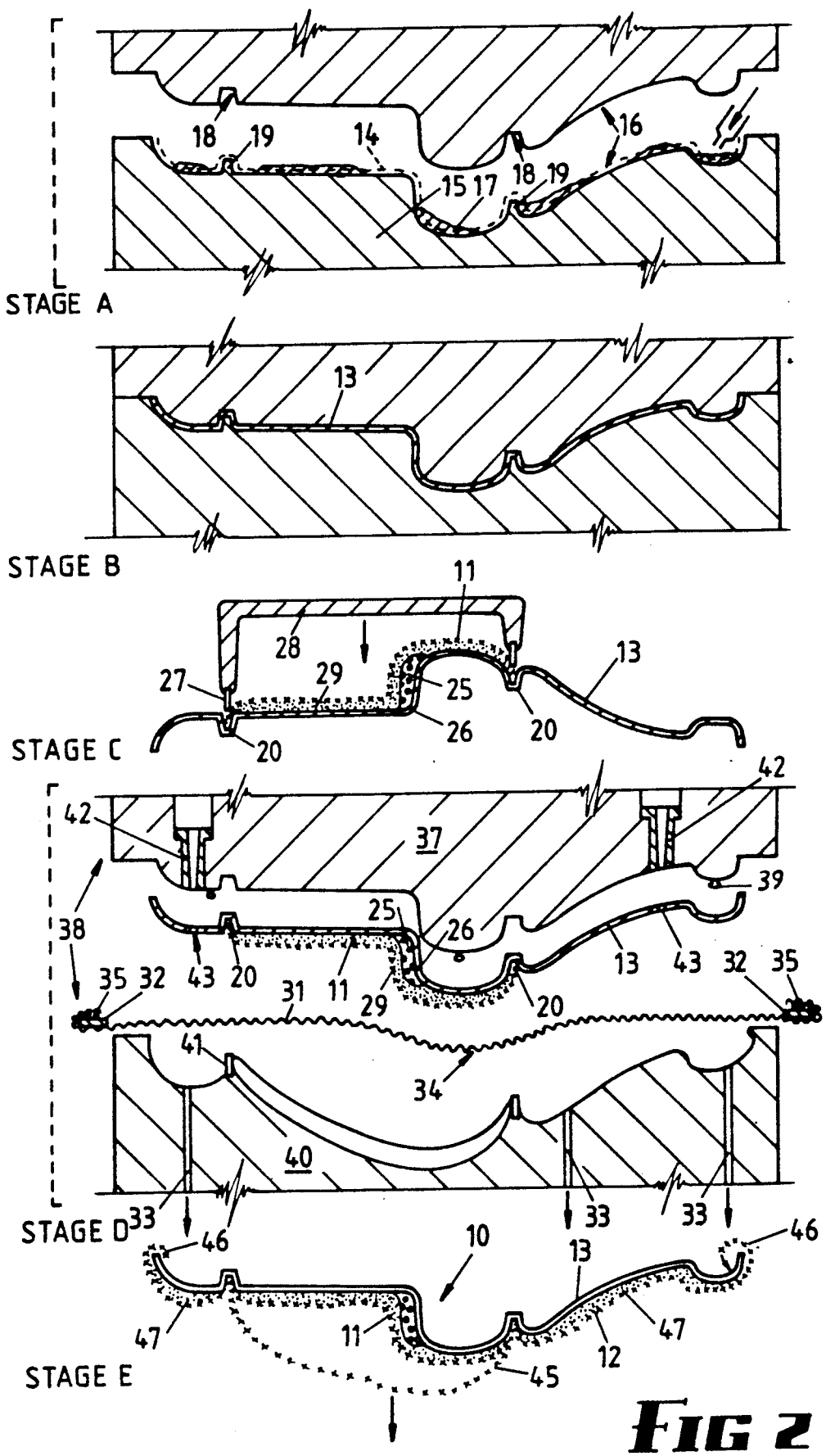

VEHICLE INNER PANEL

This invention relates to a vehicle inner panel, for example, a door inner panel.

BACKGROUND OF THE INVENTION

In our Australian Patent Application 41111 (PJ 0617) dated the Sept. 7, 1989, there was described an inner panel and a method of producing that inner panel which involved initially moulding a substrate in a cross linked polymeric material, the substrate being subsequently placed in a die in which was first sprayed a "paint", over which ingredients for a foam padding material were injected and the product was removed from the die with a polyurethane face film.

There was also disclosed a method of securing a sub-panel of fabric material for facing purposes, and a good line definition around the periphery of the fabric was achieved by establishing a die cavity in one die part to define the periphery of the fabric finished area. A die projection was incorporated in a second die part, which entered the cavity when the die set was closed, and pressure was thereby applied against the substrate through the fabric when the mould was closed.

There is sometimes a requirement for a door inner panel which has fabric over its entire surface or a considerable portion thereof, and sometimes that fabric requires a sub-panel of matching or contrasting fabric, say for example around the armrest area. The contrasting or matching fabric may have a different texture for improved resistance to wear.

PRIOR ART

The most relevant prior art known to the Applicant is the European Application 0 265 313 in the name of AUTOMOBILES PEUGEOT, wherein fabric and carpet were first retained in a mould by application of vacuum, part of the mould, together with the fabric and carpet, was masked, one colour elastomer was sprayed, a substrate positioned, edges returned over the substrate where required, and soft foam-forming chemicals were injected.

Other prior art thought to be relevant comprises the U.S. Pat. No. 4,455,340 TOYOHIKO OKINA, wherein a moulded foam comprises a surface layer of elastomeric thin film, an intermediate reinforcing layer of elastic film, and a core layer.

This invention seeks to provide a method which will be economical and which will not involve excessive labour in providing a panel of padded fabric for the facing surface of a vehicle inner panel, for example a door inner panel, and be capable of providing a sub-panel of different fabric, at least partly surrounded by a padded fabric panel. Heretofore such a construction has been possible only by cementing the fabric in place, and carefully joining the lines of the sub-panel and major panel, and this is so time consuming and expensive an operation as not to be viable.

BRIEF SUMMARY OF THE INVENTION

This invention provides a method of producing a vehicle inner panel with a padded fabric surface, and includes firstly moulding a substrate of polymeric material, suitably polyurethane, attaching the substrate to one die of a two part die set, stretching a fabric sheet on a stretch frame, interposing the stretched fabric sheet between the other die of the die set and the substrate, injecting foam forming polyurethane through the substrate and allowing it to foam while the dies are closed, opening the dies, removing the assembly, and trimming the fabric.

This will be seen to be a process having less steps than the above-identified Peugeot patent application, and is believed can provide a product of at least equal quality.

In an embodiment the method includes firstly moulding a substrate to have a groove defining the periphery of a fabric sub-panel, cementing the sub-panel to the face of the substrate and incorporating the peripheral edge of the sub-panel into the groove but allowing it to overlap the groove area if required, positioning the substrate with its sub-panel cemented thereto into one portion of a die, stretching the remaining fabric facing panel across a stretch frame and incorporating into the die, closing the die to force portion of the main panel fabric also into the groove by projection means on the die, and injecting the ingredients of a foam forming polyurethane through the substrate and into the space between the main fabric panel and the substrate to provide a soft padding.

When the die is opened after the glue and polyurethane foam have cured, removal of the overlying portion of the main panel from the sub-panel of fabric may be simply achieved by cutting the fabric of the main panel where it has entered the groove.

DETAILED DESCRIPTION OF THE PREFERRED EMBODIMENT

An embodiment of the invention is described hereunder in some detail with reference to and is illustrated in the accompanying drawings, in which:

FIG. 2 is a diagrammatic representation of production stages in the production of the inner panel.

Figure 1:
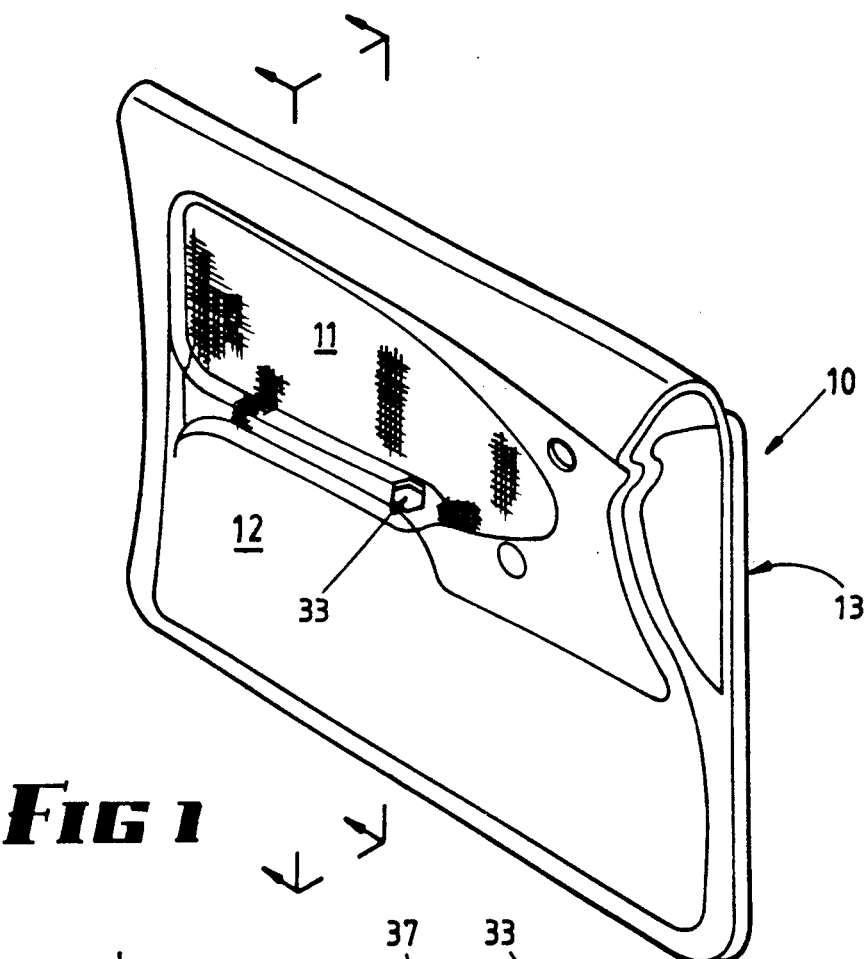
FIG. 1 is a perspective view of a vehicle door inner panel.

In this embodiment, a door inner panel 10 is provided with a facing fabric sub-panel 11 capable of accepting heavy wear conditions (at the locality of the armrests), and a facing fabric main panel 12, the sub-panel and main panel both being formed of fabric material and the main panel 12 preferably being of a velour material. However the invention is in no way limited to such material, but it is desirable that at least the main panel 12 should be of a fabric capable of stretch in two directions.

The first stage of production (Stage A, FIG. 2) is to separately form a substrate 13 of cross linked polymeric material, in this embodiment polyurethane, to provide a firm backing for the fabric panels 11 and 12.

This is formed by firstly laying continuous filament glass fibers 14 in the lower die part 15 of a two part die set 16, and either injecting; or as shown, decanting the chemical ingredients of polyurethane which react to form a dense cross-linked substrate, when die parts 16 are closed (Stage B). The die parts have a mating groove 18 and blade 19 so that substrate 13 is formed with a groove 20 as seen in Stages C and D of FIG. 2. After moulding, substrate 13 is punched to provide key-holes by which it can be located in a subsequent die, and also foam injection apertures. These are described below. It may also be trimmed.

In Stage C, substrate 13 is inverted, a layer of soft polyurethane padding 25 is cemented over an arm rest portion 26 of the substrate, the fabric sub-panel 11 is cemented to the then upper surface of substrate 13, and the edges are depressed into the groove 20 by blades 27 of a small inserting tool 28. The sub-panel 11 can be a single sheet of cloth, or a laminate as shown, having an intermediate layer 29 of foam polymeric material to provide a "soft" feel. At the locality of the arm rest portion 26, it is unlikely that sub-panel 11 will accommodate all the complex curves of substrate 13, and it is apertured at 33 (FIG. 1) to assist its conformation. The aperture is chosen to be at a locality where an aperture is otherwise required (for example, a door handle aperture).

Referring now to Stage D of FIG. 2, a sheet of velour, having a backing film of polyurethane, and which is to become the main fabric panel 12, is stretched over a peripheral frame 32 having a touch and hold upper surface 5 (or a series of retaining pins projecting from that upper surface), which retains the fabric edges. Vacuum may be applied through apertures 33 to draw the main fabric panel downwardly over the substrate. It is important that the main panel 12 should be stretchable, and localised initial stretch may be imparted as at 34 if necessary.

The upper die part 37 of a second die set 38 has projecting pins 39 which penetrate the key-holes (not shown) to carry the initial sub-assembly, and is closed against the lower die part 40. Projecting blade 41 forces the velour of the main fabric panel 12 up into the groove 20, so that the velour then completely overlies the sub-panel 11. The ingredients of foamable polyurethane is injected through the injection nozzles 42 and injection apertures 43 in the substrate 13 while the dies are closed and this is allowed to foam and cure between substrate 13 and fabric panel 12, while at the same time the glue between the fabric sub-panel 11 and substrate 13 also cures.

As shown in Stage E of FIG. 2, when the curing is completed, the assembly is removed from the die and the overlying part 45 of the main fabric panel 12 is cut away from the underlying sub-panel 11 so as to expose it, by means of a hand operation, cutting the main fabric panel 12 in groove 20 with a knife. This operation however is very quick because the knife is guided in its movement through the groove 20 by the material which is contained therein. Peripheral edges 46 of panel 12 are returned over the back face of substrate 13, to which they are cemented. The polyurethane foam 47 forms a padding which fills the void between the main fabric panel 12 and the substrate 13, and applies a tension to the main fabric panel 12. Finally, the panel may be subjected to a punching operation, for further holes required to house ashtrays, handles, locks and other accessories.

The resultant panel is found to have a very pleasing appearance, and is inexpensive to produce.

Figure 3:
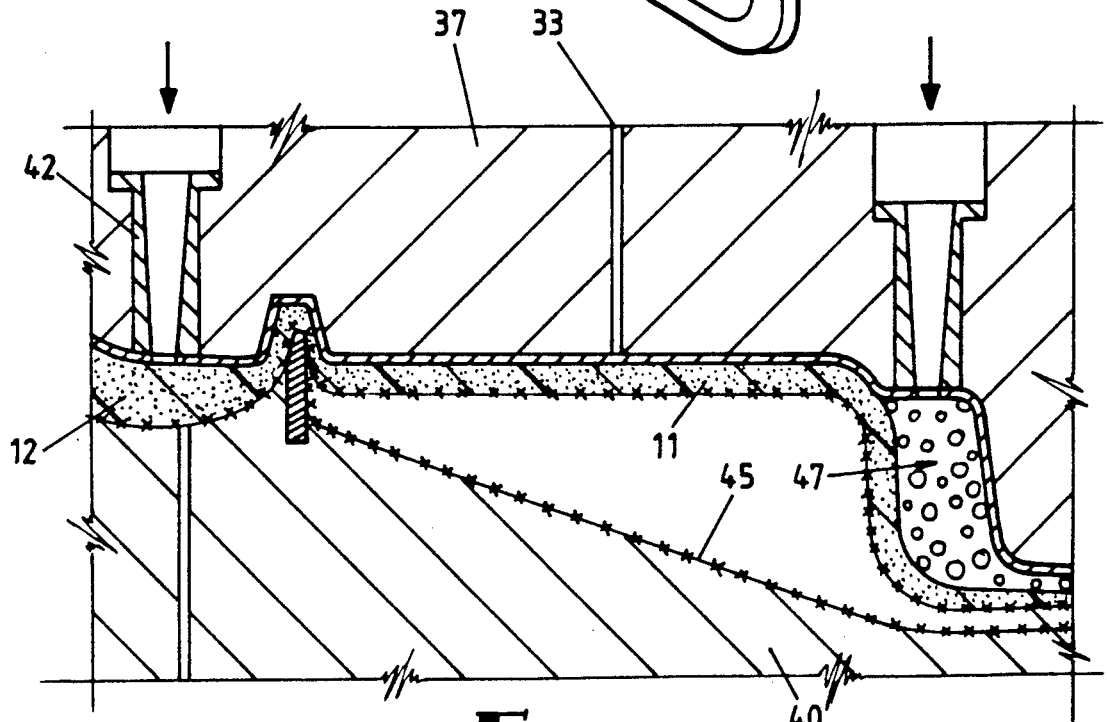
FIG. 3 is a diagrammatic section through a die and drawn to a larger scale, showing the manner in which the substrate is placed into juxtaposition with the main fabric panel and polyurethane foam forming material is injected.

FIG. 3 shows a minor modification wherein the padding 25 is replaced by foam 47 injected through a further nozzle 42 during the injection stage (Stage D). The sub-panel may be retained in position by vacuum applied through apertures 33 in the upper die part 37.

The modification required is only small for producing a facing which partly comprises a coloured facing film. Either the entire area is sprayed or only that portion which will be exposed, and the fabric is applied in the same way and its edge is trimmed with a knife or cutting tool.

We claim:
1. A method of forming a vehicle inner panel, comprising:
   (a) moulding a substrate of polymeric material,
   (b) attaching the substrate to a first die part of a two-part die set,
   (c) attaching peripheral edges of a sheet of stretchable fabric to a peripheral frame surrounding and free from the die set, whereby the fabric is freely held with respect to the die set, and interposing the freely held fabric sheet between the substrate and a second die part of the die set,
   (d) closing the first die part to the second die part to bring the substrate into juxtaposition with the fabric sheet, and also to deform the fabric sheet to the shape of the substrate,
   (e) injecting foam-forming polymeric material through the substrate to lie between the substrate and the fabric sheet, and allowing the polymeric material to foam and at least partly set while the die parts remain closed to stretch the fabric sheet and to maintain the fabric sheet in stretched condition over the foamed polymeric material, and
   (f) opening the die parts, and removing the assembly of substrate, foam and fabric from the die parts and from the frame.

2. A method of forming a vehicle inner panel comprising:
   (a) moulding a substrate of polymeric material, said moulding step further comprising forming a groove in a face of the substrate,
   (b) cementing a pad of foam material to a portion of the substrate, and cementing a sub-panel of fabric over the foam pad and portion of the substrate,
   (c) urging edges of the sub-panel into the groove with blades of an inserting tool,
   (d) attaching said substrate to a first die part of a two-part die set,
   (e) attaching peripheral edges of a sheet of fabric to a stretching device, and interposing the fabric sheet between said substrate and a second die part of said die set,
   (f) closing said first die part to said second die part to bring said substrate into juxtaposition with said fabric sheet, and to deform the fabric sheet to the shape of the substrate,
   (g) injecting foam-forming polymeric material through said substrate to lie between the substrate and said fabric sheet, and allowing the polymeric material to foam and at least partly set while said die parts remain closed, and
   (g) opening said die parts, and removing the assembly of substrate, foam and fabric from the die parts and from said stretching device.

3. A method of forming a vehicle inner panel comprising:
   (a) moulding a substrate of polymeric material, said moulding step further comprising forming a groove in a face of said substrate,
   (b) cementing portion only of a sub-panel of fabric over a portion of the substrate, and urging edges of the sub-panel into the groove with blades of an inserting tool,
   (c) attaching said substrate to a first die part of a two-part die set, (d) attaching peripheral edges of a sheet of fabric to a stretching device, and interposing the fabric sheet between said substrate and a second die part of said die set, (e) closing said first die part to said second die part to bring said substrate into juxtaposition with said fabric sheet, and to deform the fabric sheet to the shape of the substrate, (f) injecting foam-forming polymeric material through the substrate to lie between the substrate and an uncemented portion of the sub-panel, and to lie between the substrate and said fabric sheet, and allowing the polymeric material to foam and at least partly set while said die parts remain closed, and (g) opening said die parts, and removing the assembly of substrate, foam and fabric from the die parts and from said stretching device.

4. A method of forming a vehicle inner panel comprising:

(a) moulding a substrate of polymeric material, said moulding of the substrate further comprises forming a groove in a face of the substrate, (b) locating a pad of foam material to a portion of the substrate surrounded by the groove, cementing a sub-panel of fabric over the foam pad and that said substrate portion, (c) urging edges of the sub-panel into the groove with an inserting tool, (d) attaching said substrate to a first die part of a two-part die set, (e) urging portion of the fabric sheet into the groove in the substrate with a blade in the second die part of said die set during closure of the first die part, (f) attaching peripheral edges of a sheet of fabric to a stretching device, and interposing the fabric sheet between said substrate and said second die part of said die set, (g) closing said first die part to said second die part to bring said substrate into juxtaposition with said fabric sheet, and to deform the fabric sheet to the shape of the substrate, (h) injecting foam-forming polymeric material through said substrate to lie between the substrate and said fabric sheet, and allowing the polymeric material to foam and at least partly set while said die parts remain closed, (i) opening said die parts, and removing the assembly of substrate, foam and fabric from the die parts and from said stretching device, and (j) removing that portion of the fabric sheet which overlies said sub-panel of fabric from the remainder by moving a knife through the groove.

5. A method of forming a vehicle inner panel according to claim 2 comprising cutting the fabric of one at least of said sheet of fabric and sub-panel of fabric at a location where the fabric is unable to stretch sufficiently to accommodate compound curves of the substrate.

6. A method of forming a vehicle inner panel according to claim 2 further comprising applying vacuum to the fabric of one at least of said sheet of fabric and sub-panel of fabric to retain it to its respective die part during step (e) of claim 1.

7. A method according to claim 1 further comprising, after said removal of assembly, returning peripheral edges of the fabric over a back face of the substrate and cementing to said back face.

8. A method of forming a vehicle inner panel comprising:

(a) moulding a substrate of polymeric material to have a groove in a face thereof, (b) locating a pad of foam material and a sub-panel of fabric over a portion of the substrate surrounded by the groove, (c) urging edges of the sub-panel into the groove with a blade of an inserting tool, (d) locating the substrate to a first die part of a two-part die set with said face directed to the second die part thereof, (e) interposing a fabric sheet between said face and second die part, (F) closing the first die part and the second die part to bring the substrate into juxtaposition with the fabric sheet, and also deform the fabric sheet to the shape of the substrate, (g) urging portion of the fabric sheet into said groove with a blade of the second die part, (h) injecting foam-forming polymeric material to lie between the substrate and the fabric sheet, and allowing the polymeric material to foam and at least partly set while the die ports remain closed, (i) opening the die parts, and removing the assembly of substrate, foam and fabric sheet from the die set, and (j) removing that portion of the fabric sheet which overlies said sub-panel.

* * * * *